US012631499B2

(12) United States Patent
Li et al.

(10) Patent No.: US 12,631,499 B2
(45) Date of Patent: May 19, 2026

(54) SYSTEMS AND METHODS FOR COOLING SENSOR PACKAGES

(71) Applicant: Deere & Company, Moline, IL (US)

(72) Inventors: Yueqi Li, San Jose, CA (US); Gabriella Levine, San Francisco, CA (US); Erich Schlaepfer, Sunnyvale, CA (US)

(73) Assignee: Deere & Company, Moline, IL (US)

( * ) Notice: Subject to any disclaimer, the term of this patent is extended or adjusted under 35 U.S.C. 154(b) by 772 days.

(21) Appl. No.: 17/848,979

(22) Filed: Jun. 24, 2022

(65) Prior Publication Data

US 2023/0417603 A1     Dec. 28, 2023

(51) Int. Cl.
| | |
|---|---|
| *G01K 3/00* | (2006.01) |
| *B05B 1/20* | (2006.01) |
| *B05B 12/00* | (2018.01) |
| *G01K 1/02* | (2021.01) |
| *A01C 23/04* | (2006.01) |
| *A01G 25/09* | (2006.01) |
| *A01M 7/00* | (2006.01) |

(52) U.S. Cl.
CPC ............... *G01K 3/005* (2013.01); *B05B 1/20* (2013.01); *B05B 12/004* (2013.01); *G01K 1/026* (2013.01); *A01C 23/047* (2013.01); *A01G 25/09* (2013.01); *A01M 7/0042* (2013.01)

(58) Field of Classification Search
CPC ........ B05B 1/20; B05B 12/004; G01K 3/005; A01M 7/0042; A01C 23/047; H04N 23/51–52; G03B 17/55; G01D 11/245
See application file for complete search history.

(56) References Cited

U.S. PATENT DOCUMENTS

| | | | |
|---|---|---|---|
| 10,327,393 B2 | 6/2019 | Redden et al. | |
| 11,116,050 B1 * | 9/2021 | Bhogal | H05B 6/6447 |
| 2018/0289996 A1 * | 10/2018 | Kim | A62C 37/04 |

(Continued)

FOREIGN PATENT DOCUMENTS

| | | |
|---|---|---|
| CN | 110313344 A | 10/2019 |
| CN | 114600747 A | 6/2022 |

(Continued)

OTHER PUBLICATIONS

Satish C. Mohapatra, "An Overview of Liquid Coolants for Electronics Cooling", Retrieved from https://electronics-cooling.com/2006/05/an-overview-of-liquid-coolants-for-electronics-cooling/, 6 pages, dated May 1, 2006.

(Continued)

*Primary Examiner* — Tuongminh N Pham
(74) *Attorney, Agent, or Firm* — Fenwick & West LLP

(57) ABSTRACT

Implementations are disclosed for a cooling system for cooling sensor packages disposed on an agricultural vehicle, robot, etc. In various implementations, the cooling system includes: a reservoir containing a coolant; one or more sprayers to dispense the coolant from the reservoir at a target; a conduit that fluidly couples the reservoir with the one or more sprayers; and a sensor package that includes at least one processor. At least a portion of the sensor package is in contact with the conduit so that heat is dissipated from the sensor package by the coolant flowing through the conduit.

8 Claims, 5 Drawing Sheets

(56)       References Cited

U.S. PATENT DOCUMENTS

| | | | |
|---|---|---|---|
| 2019/0150357 A1* | 5/2019 | Wu | H04N 7/188 |
| 2021/0181606 A1* | 6/2021 | Vitanov | G01K 1/08 |

FOREIGN PATENT DOCUMENTS

| | | | |
|---|---|---|---|
| JP | 2018099517 A | 6/2018 | |
| WO | WO-2023069432 A1 * | 4/2023 | A01M 7/006 |

OTHER PUBLICATIONS

Les Harrison, "Farm Equipment Maintenance: Time to Check the Coolant System", Retrieved from https://agfax.com/2017/12/04/farm-equipment-maintenance-time-to-check-the-coolant-system/, 5 pages, dated Dec. 4, 2017.
European Patent Office; International Search Report and Written Opinion issued in Application No. PCT/US2023/024435; 11 pages; dated Sep. 29, 2023.

* cited by examiner

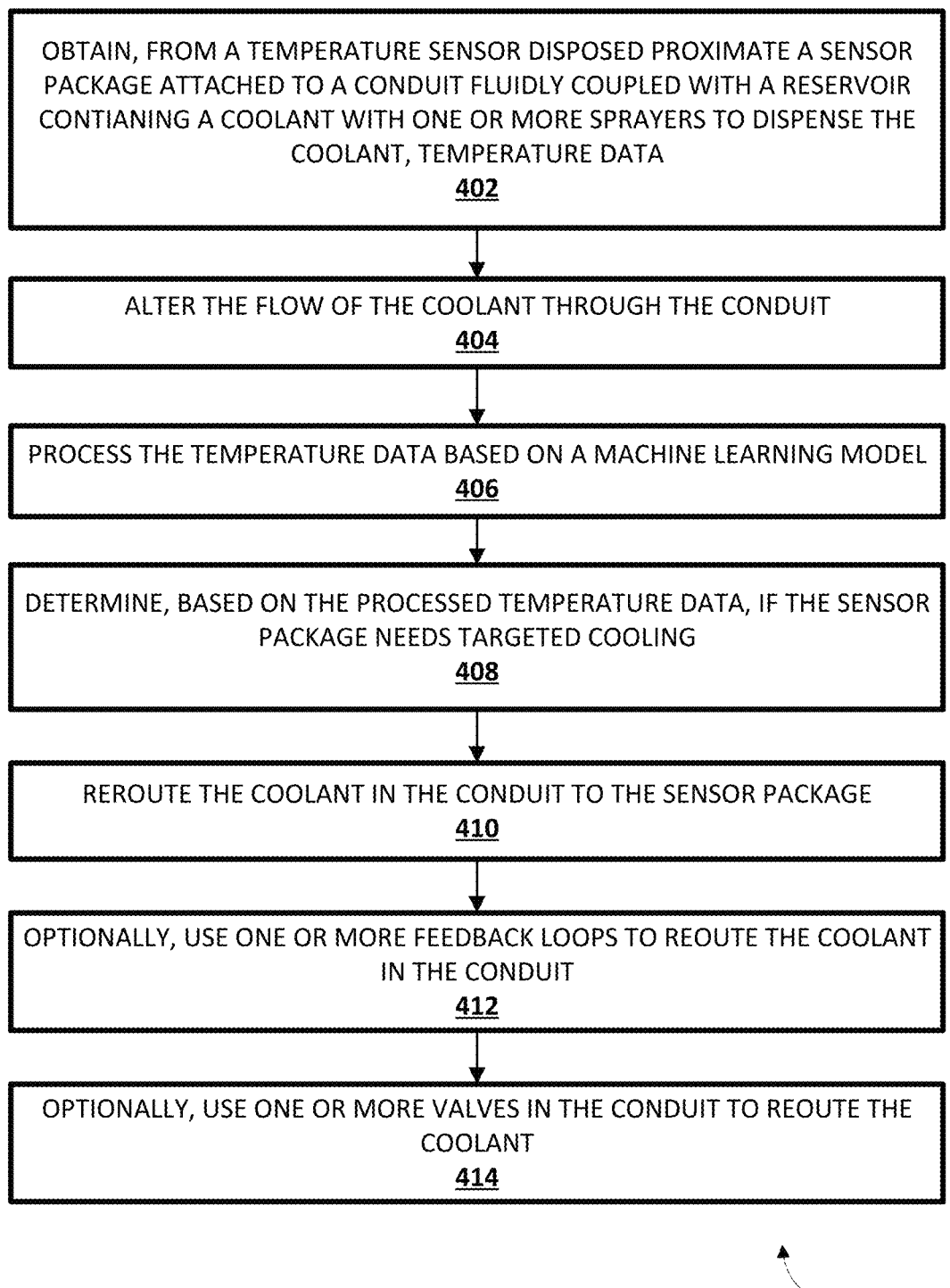

OBTAIN, FROM A TEMPERATURE SENSOR DISPOSED PROXIMATE A SENSOR PACKAGE ATTACHED TO A CONDUIT FLUIDLY COUPLED WITH A RESERVOIR CONTIANING A COOLANT WITH ONE OR MORE SPRAYERS TO DISPENSE THE COOLANT, TEMPERATURE DATA
402

ALTER THE FLOW OF THE COOLANT THROUGH THE CONDUIT
404

PROCESS THE TEMPERATURE DATA BASED ON A MACHINE LEARNING MODEL
406

DETERMINE, BASED ON THE PROCESSED TEMPERATURE DATA, IF THE SENSOR PACKAGE NEEDS TARGETED COOLING
408

REROUTE THE COOLANT IN THE CONDUIT TO THE SENSOR PACKAGE
410

OPTIONALLY, USE ONE OR MORE FEEDBACK LOOPS TO REROUTE THE COOLANT IN THE CONDUIT
412

OPTIONALLY, USE ONE OR MORE VALVES IN THE CONDUIT TO REROUTE THE COOLANT
414

SYSTEMS AND METHODS FOR COOLING SENSOR PACKAGES

BACKGROUND

Precision agriculture is becoming increasingly commonplace due to the advancement of various different technologies, such as agricultural robots and rovers, to name a few. These technologies enable the capture of enormous amounts of agricultural sensor data—particularly high-resolution imagery—at close range. These agricultural sensor data can then be processed by a variety of different agricultural tasks to make decisions on the scale of individual plants, or even constituent parts of plants. For example, high-resolution imagery may be processed using machine learning models to generate various agricultural inferences that can be the basis for targeted agricultural decision making.

In some implementations, sensor(s) including at least a processor may be packaged together forming a sensor package. These sensor packages may be mountable on various agricultural vehicles such as tractors, boom, pivots, irrigation systems, etc. One challenge with these sensor packages is their proclivity to overheat, which may be especially true when the sensor packages are disposed on various pieces of agricultural equipment that may be exposed to harsh environmental conditions, including heat and sunlight. Furthermore, it may not be desirable to include active cooling mechanisms (such as fans) as a part of the sensor packages, as they may increase the size and/or complexity of the sensor package.

SUMMARY

Implementations are described herein for leveraging fluids that are already being deployed, e.g., for purposes such as being applied to crops, to cool sensor packages and/or other modular computing devices. A sensor package including at least a processor, may be in contact with a conduit (e.g., along a boom affixed to a tractor, along a center pivot deployed in a field, or the like) which has one or more materials flowing therethrough and one or more sprayers for dispensing the material flowing therethrough. In implementations where the conduit is an irrigation boom, the material flowing through the conduit may include, for instance, water, liquid fertilizer, liquid pesticides, and/or other liquid substances that may be dispensed onto an agriculture field. In other instances, the conduit may have any liquid or gas coolant running therethrough, for example water, atmospheric air, hydrogen, or the like. Portion(s) of the sensor packages (e.g., their processors) may be disposed in thermal contact with the conduit, for example through the use of one or more thermal interface materials (TIMs). TIMs may be inserted between two components to enhance the thermal coupling. In the present context, TIMs may be used to facilitate heat dissipation between a heat-producing device, in this instance the sensor package, and a heat-dissipating device, in this instance the conduit. The TIMs may include, but are not limited to: a thermal paste, thermal adhesive, thermal gap filler, a thermally conductive pad, and the like. The material flowing through the conduit, in addition to being dispensed by the sprayer(s), may be used to cool the sensor package(s) in contact with the conduit.

In some implementations, the conduit and/or the sensor package may additionally include one or more temperature sensors. In some such implementations, each sensor package may have its own temperature sensor. In other such implementations, temperature sensors may be strategically disposed along the conduit, for example one temperature sensor for every so many sensor packages or one or more temperature sensors per each predefined zone or region of conduit. The temperature sensor(s) may be coupled to a computing device to, in response to the sensed temperature, control the flow of material through the conduit. For example, in one implementation, the flow of the material through the conduit may be turned on or off based on the temperature (e.g. when a certain threshold or range is reached).

In other implementations, the computing device may actively manage the flow through the conduit through one or more feedback loops that may, for example, target certain warmer sensor packages and/or regions of the conduit. Notably, this management of fluid flow may occur regardless of whether the fluids are being actively applied in an agricultural field. For example, the computing device may manage the flow through the conduit even while the agricultural vehicle is being transported through a field, and before it begins applying irrigation or other chemicals. In some implementations, signal(s) generated by the temperature sensor(s) may be analyzed using artificial intelligence and/or machine learning to determine which sensor packages and/or regions of the conduit are currently subjected to greater amounts of heat (e.g., sunlight, heat from a tractor engine, etc.) in order to cool the sensor packages in a targeted manner while minimizing disruption of the dispensing of the fluid towards its target(s) (e.g., crops).

In some implementations where an agricultural vehicle carries the sensor package(s), the vehicle's hydraulic system may be used to cool the sensor package(s). Similar to the conduit described previously herein, the hydraulic system of the vehicle may also include a conduit with a fluid flowing therethrough, specifically for control of various hydraulic motors and/or machinery of the vehicle. The fluid of the hydraulic system may be controlled by control valves disposed throughout the conduit. The conduit of the hydraulic system may also be used as a heat sink for sensor package(s) by placing the sensor packages on the conduit of the hydraulic system and/or by altering the route the conduit of the hydraulic system to the required locations of the sensor package(s). Similar to previous implementations, portion(s) of the sensor package(s) may be disposed in thermal contact with the conduit of the hydraulic system, for example through the use of one or more TIMs to facilitate heat dissipation between a heat-producing device (e.g., the sensor package) and a heat-dissipating device (e.g. the conduit).

In an aspect a cooling system includes: a reservoir containing a coolant; one or more sprayers to dispense the coolant from the reservoir at a target; a conduit that fluidly couples the reservoir with the one or more sprayers; and a sensor package including at least one processor, at least a portion of the sensor package being in contact with the conduit; where heat is dissipated from the sensor package by the coolant flowing through the conduit.

In some implementations, the sensor package is in thermal contact with the conduit through one or more thermal interface materials.

In some implementations, the conduit is an irrigation boom and the coolant is water, liquid fertilizer, liquid pesticide, or a combination thereof. In other implementations, the coolant is gaseous. In some implementations, the conduit is constructed of a metal and the metal is a heat sink for heat dissipated by the sensor package. In other implementations, the conduit is part of a hydraulic system.

In some implementations, the cooling system additionally includes a temperature sensor disposed near the sensor package and coupled to one or more processors, where the one or more processors are configured to detect, by the temperature sensor, a temperature, and based the detected temperature satisfying a threshold, alter a flow of the coolant through the conduit. In some such implementations, the one or more processors include the at least one processor of the sensor package. In other such implementations, the sensor package is a first sensor package of a plurality of sensor packages, and the temperature sensor is a first temperature sensor of a plurality of temperature sensors; where each sensor package of the plurality of sensor packages includes one temperature sensor of the plurality of temperature sensors; where a computing device is further configured to: detect, for each of the plurality of temperature sensors, a temperature; determine, for each of the plurality of temperature sensors, whether the detected temperature is above a predetermined threshold temperature; and alter the flow of the coolant based on the determination that the detected temperature is above the predetermined threshold temperature.

In another aspect, a sensor package includes: a processor; where at least a portion of the sensor package is configured to contact a conduit that fluidly couples a reservoir containing a coolant with one or more sprayers to dispense the coolant; where heat is dissipated from the sensor package by the coolant flowing through the conduit, when the sensor package is coupled with the conduit.

In some implementations, the sensor package is configured to be in thermal contact with the conduit through one or more thermal interface materials. In other implementations, the sensor package is configured to contact the conduit of an irrigation boom and the coolant is water, liquid fertilizer, liquid pesticide, or a combination thereof. In still other implementations, the sensor package is configured to contact the conduit that is part of a hydraulic system. In some implementations, the sensor package is configured to contact the conduit that is constructed of a metal and the metal is a heat sink for heat dissipated by the sensor package.

In some implementations, the sensor package additionally includes a temperature sensor disposed proximate the sensor package and coupled to one or more processors, where the one or more processors are configured to: detect, by the temperature sensor, a temperature, and based the detected temperature satisfying a threshold, alter a flow of the coolant through the conduit.

In some implementations, the sensor package is a first sensor package of a plurality of sensor packages, and the temperature sensor is a first temperature sensor of a plurality of temperature sensors; where each sensor package of the plurality of sensor packages includes one temperature sensor of the plurality of temperature sensors; where a computing device is further configured to: detect, for each of the plurality of temperature sensors, a temperature; determine, for each of the plurality of temperature sensors, whether the detected temperature is above a predetermined threshold temperature; and alter the flow of the coolant based on the determination that the detected temperature is above the predetermined threshold temperature.

In yet another aspect, a method implemented using one or more processors, includes: obtaining, from a temperature sensor disposed proximate a sensor package attached to a conduit that fluidly couples a reservoir containing a coolant with one or more sprayers to dispense the coolant, temperature data; altering a flow of the coolant through the conduit, where the altering includes: processing the temperature data based on a machine learning model; determining, based on the processed temperature data, if the sensor package needs targeted cooling; and rerouting the coolant in the conduit to the sensor package.

In some implementations, the rerouting the coolant in the conduit to the sensor package further includes using one or more feedback loops. In other implementations, the coolant in the conduit to the sensor package further includes opening or closing one or more valves in the conduit.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Yet other implementations include agricultural vehicles, such as robots, that are equipped with edge processor(s) configured to carry out selected aspects of the present disclosure.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 is a flowchart of an example method in accordance with various implementations described herein.

DETAILED DESCRIPTION

Implementations are described herein for leveraging a coolant (e.g. water, fertilizer, etc.) that is already being deployed, e.g., for purposes such as being applied to crops, to cool sensor packages and/or other modular computing devices. More particularly, but not exclusively, a sensor package may be in contact with a conduit (e.g., along a boom affixed to a tractor, along a center pivot deployed in a field, or the like) which has one or more materials flowing therethrough and one or more sprayers for dispensing the material flowing therethrough. In some implementations, the conduit may be an irrigation boom that is conventionally used for dispensing water, liquid fertilizer, liquid pesticides, and/or other liquid substances that may be dispensed onto an agriculture field. The material flowing through the conduit may be used to cool the sensor package(s) in contact with the conduit, such that heat may dissipate between a heat-producing device, in this instance the sensor package, and a heat-dissipating device, in this instance the conduit.

Figure 1:
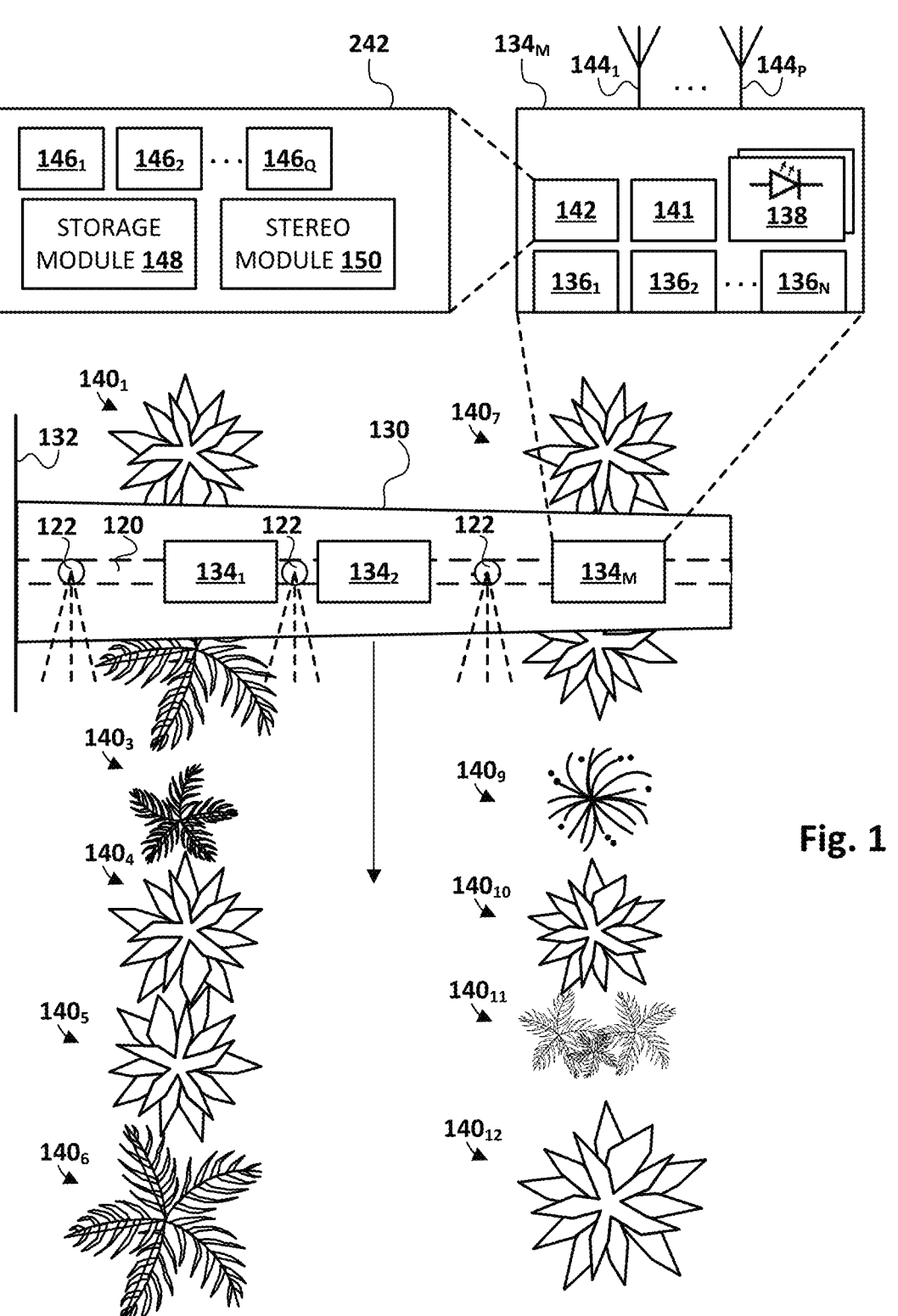
FIG. 1 schematically depicts an example environment in which disclosed techniques may be employed in accordance with various implementations.

FIG. 1 depicts an example field of plants 140$_{1-12}$. An agricultural boom 130 mounted to a vehicle 132 (mostly not visible in FIG. 1, e.g., a tractor, a robot, a truck, etc.) is being carried over plants $140_{1-12}$ as shown by the arrow to perform agricultural tasks and/or to gather sensor data. Boom 130 may include, for instance, a conduit 120 with one or more sprayers 122 or sprinklers for irrigation, sprayers for chemical application, etc. Also mounted on boom 130 are a plurality of sensor packages $134_{1-M}$ according to selected aspects of the present disclosure. Although shown as boxes on top of the conduit 120 of the boom 130 in FIG. 1, the sensor packages $134_{1-M}$ may alternatively be mounted along the conduit 120 at other locations of boom 130. Furthermore, while multiple sensor packages $134_{1-M}$ are depicted in FIG. 1, any number of sensor packages 134, such as a single sensor package 134, may be deployed in similar fashions.

As shown by the called-out window at top right, sensor package $134_M$ may, in some implementations, include one or more sensors in the form of vision sensors $136_{1-N}$, one or more lights 138, a light controller 141, and processor 142 that is configured to carry out selected aspects of the present disclosure. Such components, in particular light(s) 138, may produce heat that may contribute a sensor package's proclivity to overheat. Other sensor packages may or may not be similarly configured. Vision sensors $136_{1-N}$ may take various forms, and may or may not be the same as each other. These forms may include, for instance, an RGB digital camera, a stereoscopic camera, an infrared camera, a 1.5D camera, a 3D camera, a light detection and ranging (LIDAR) sensor, and so forth.

The sensor package $134_M$ may also include one or more wireless antenna $144_{1-P}$. In some implementations, each wireless antenna 144 may be configured to transmit and/or receive different types of wireless data. For example, where a temperature sensor (not illustrated in FIG. 1) is included within the sensor package $134_M$. a first antenna $144_1$ may be configured to transmit and/or receive wireless temperature data, e.g., for purposes such as determining if and/or where targeted cooling of the sensor package $134_M$ may be needed. Another antenna $144_P$ may be configured to transmit and/or receive IEEE 802.12 family of protocols (Wi-Fi) or Long-Term Evolution (LTE) data. Another antenna 144 may be configured to transmit and/or receive 5G data. Any number of antennas 144 may be provided to accommodate any number of wireless technologies.

Processor 142 may include various types of circuitry (e.g. FPGA, ASIC) that is configured to carry out selected aspects of the present disclosure. For example, and as shown in the called-out window at top left in FIG. 1, processor 142 may include any number of tensor processing units (TPU) $146_{1-Q}$, a storage module 148, and a stereo module 150 (one or more graphical process units (GPU) and/or central processing units (CPU) may also be present, even if not depicted). In some implementations, four TPUs $146_{1-4}$ may be employed to process sensor data, e.g., in parallel, using four different machine learning models, e.g., at an inference frame rate per model of 10 FPS or greater. Storage module 148 may be configured to acquire and store, e.g., in various types of memories onboard sensor package 134, sensor data acquired from one or more sensors (e.g., vision sensors $136_{1-N}$). This processing may be computationally intense, and consequently, may increase a temperature of processor 142 (and in some cases, the entire sensor package 134)

Figure 2:
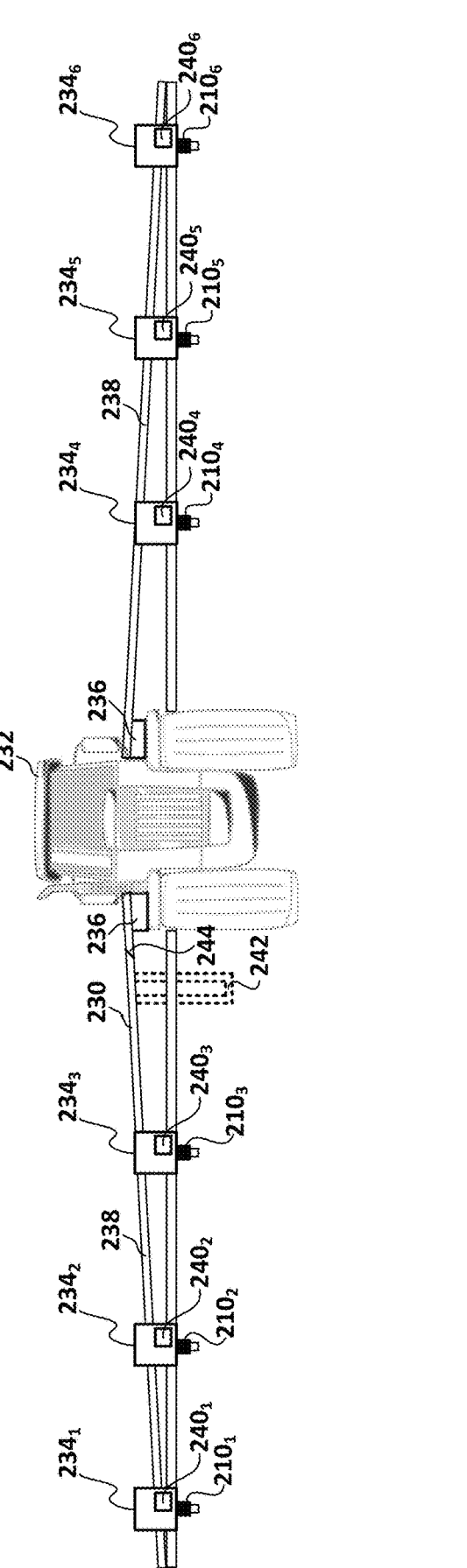
FIG. 2 depicts an example of how sensor packages may be deployed on an agricultural vehicle.

FIG. 2 depicts another example of how sensor packages may be arranged and/or deployed on a tractor 232 equipped with a boom sprayer 230. Boom sprayer 230 includes a reservoir 236 containing a coolant, a conduit 238 that is fluidly coupled to the reservoir 236, and a plurality of sprayers $210_{1-6}$, for example three on one side of tractor 232 and three on the other, to dispense the coolant over a target (e.g. a field of plants). In some implementations, the coolant may be liquid, for example water, liquid fertilizer, liquid pesticide, or a combination thereof. In other implementations, the coolant may be gaseous, for example cooled atmospheric air, helium, carbon dioxide, hydrogen, or the like. The coolant flowing through the conduit 238, in addition to being dispensed by the sprayer(s) $210_{1-6}$, may be used to cool the sensor packages $234_{1-6}$. Portion(s) of the sensor packages $234_{1-6}$ (e.g., their processors) may be disposed in contact with the conduit 238. Often, but not exclusively, the boom sprayer 230 may be constructed of metal, and in such implementation the conduit 238 may be metal. The metal conduit 238 with the coolant flowing therethrough may function as a heat sink for passive heat dissipation of the heat generated by the sensor packages $234_{1-6}$.

The sensor packages $234_{1-6}$ may, in some implementations, be attached to the conduit 238 through the use of one or more thermal interface materials (not visible in FIG. 2). These thermal interface materials may be inserted between two components to enhance the thermal coupling of the components. In some implementations, TIMs are used to facilitate heat dissipation between a heat-producing device, in this instance the sensor package $234_{1-6}$, and a heat-dissipating device, in this instance the conduit 238. In some implementations, the thermal interface materials used to couple the sensor package $234_{1-6}$ and conduit 238 may include, but are not limited to: a thermal paste, thermal adhesive, thermal gap filler, a thermally conductive pad, and/or the like.

Although illustrated in FIG. 2 as having an equal number of sprayers $210_{1-6}$ and sensor packages $234_{1-6}$ spaced similarly across boom sprayer 230, this is not to be understood at limiting. In other implementations, the sensor packages $234_{1-6}$ may not coincide spatially with sprayers $210_{1-6}$ or other aspects of agricultural equipment. Furthermore, the illustrated number of sensor packages $234_{1-6}$ is also not intended to be limiting. The location, spacing, and/or number of sensor packages 234 may be determined by the particular sensors contained in the sensor packages 234 and/or the resulting use thereof.

In some implementations, it may not be desirable (for any number of reasons) to dispose the sensor package(s) 234 directly on the conduit 238 utilized to convey the coolant to the sprayers 210 of the boom sprayer 230. In such instances, the cooling system may include an additional conduit loop(s) 242 (illustrated in broken line) coupled with the conduit 238 of the boom sprayer 230 onto which the sensor package(s) may be disposed. This may allow for the positioning of the sensor package(s) to vary from the predefined route of the conduit 238 of the boom sprayer 230. The illustrated location of the additional conduit loop 242 in FIG. 2 is merely exemplary, and not intended to be limiting. Further, while only a single additional conduit loop 242 is illustrated in FIG. 2, this is not to be understood as limiting as any number of additional conduit loops 242 may be used to direct the positioning of the sensor packages 234.

The conduit 238 and/or additional conduit loop 242, in some implementations, may additionally include one or more valves 244 to control the flow of the coolant therethrough. These one or more valves 244 may be coupled to a computing device (e.g. computing device 510 of FIG. 5) to control the opening and closing (or degree of openness or closedness) of the valve. Accordingly, the control of the valve(s) 244 controls the flow of the coolant within the conduit 238 and/or additional conduit loop 242.

In some implementations, the conduit and/or the sensor packages $234_{1-6}$ may additionally include one or more temperature sensors $240_{1-6}$. Although illustrated in FIG. 2 as within the sensor packages $234_{1-6}$, this is not to be understood at limiting, as the temperature sensor(s) $240_{1-6}$ may be separate from the sensor packages $234_{1-6}$. For example, the sensor packages $234_{1-6}$ may be attached to the conduit 238 or agricultural vehicle (e.g. tractor 232). In some implementations, each senor package 234 may have its own temperature sensor $240_{1-6}$; while in other implementations, temperature sensors $240_{1-6}$ may be strategically disposed along the conduit 238, such that there may be one temperature sensor $240_{1-6}$ for every so many sensor packages 234. The temperature sensor(s) $240_{1-6}$ may be coupled to a computing device (e.g. computing device 510 of FIG. 5) to, in response to the sensed temperature, control the flow of the coolant through the conduit 238.

The computing device (e.g. computing device 510 of FIG. 5) may be further configured to interface with the conduit 238. For example, where the temperature detected by one (or more) of the temperature sensor(s) $240_{1-6}$ is above a predetermined threshold or within a predetermined range, the computing device may operate a valve (e.g., 244) or other fluid flow control mechanism of the conduit 238 to adjust the flow of the coolant through the conduit 238. The predetermined temperature threshold or temperature range may, in some implementations, be set by an end user. The computing device may, in some implementations, actively manage the flow of the coolant through the conduit 238 through one or more feedback loops that may, for example, target certain warmer sensor packages and/or regions of the conduit 238. In other implementations, one or more signals generated by the temperature sensor(s) $240_{1-6}$ may be analyzed using artificial intelligence and/or machine learning to determine which sensor packages $234_{1-6}$ and/or regions of the conduit are currently subjected to greater amounts of heat (e.g., from sunlight, heat from a tractor engine, etc.) in order to cool the sensor packages $234_{1-6}$, in a targeted manner while minimizing disruption of the dispensing of the fluid towards its target(s) (e.g., plants $140_{1-12}$ of FIG. 1).

In other implementations, the computing device (e.g. computing device 510 of FIG. 5) may actively manage the flow through the conduit through one or more feedback loops (e.g. additional conduit loop 242) that may, for example, target certain warmer sensor packages $234_{1-6}$ and/or regions of the conduit 238. As a non-limiting example, in some instances, it may be desirable to target the sensor packages $234_{1-6}$ and/or regions of the conduit 238 that are in direct sunlight, and thus warmer. In some implementations, one or more signals may be generated by the temperature sensor(s), these signals may be analyzed using artificial intelligence and/or machine learning to determine which sensor packages $234_{1-6}$ and/or regions of the conduit 238 are currently subjected to greater amounts of heat (e.g., sunlight, heat from a tractor engine, etc.) in order to cool the sensor packages in a targeted manner while minimizing disruption of the dispensing of the fluid towards its target(s) (e.g., crops).

In implementations where artificial intelligence and/or machine learning is used to determine which sensor packages $234_{1-6}$ and/or regions of the conduit 238 are currently in need of the greatest amount of cooling and/or subjected to greater amounts of heat, various types of machine learning models may be trained, e.g. to detect and/or classify the sensed temperature to a corresponding location of the sensor package(s) $234_{1-6}$. In some implementations, various types of neural networks may be trained to generate output of correspondence data of the temperatures and locations.

Figure 3:
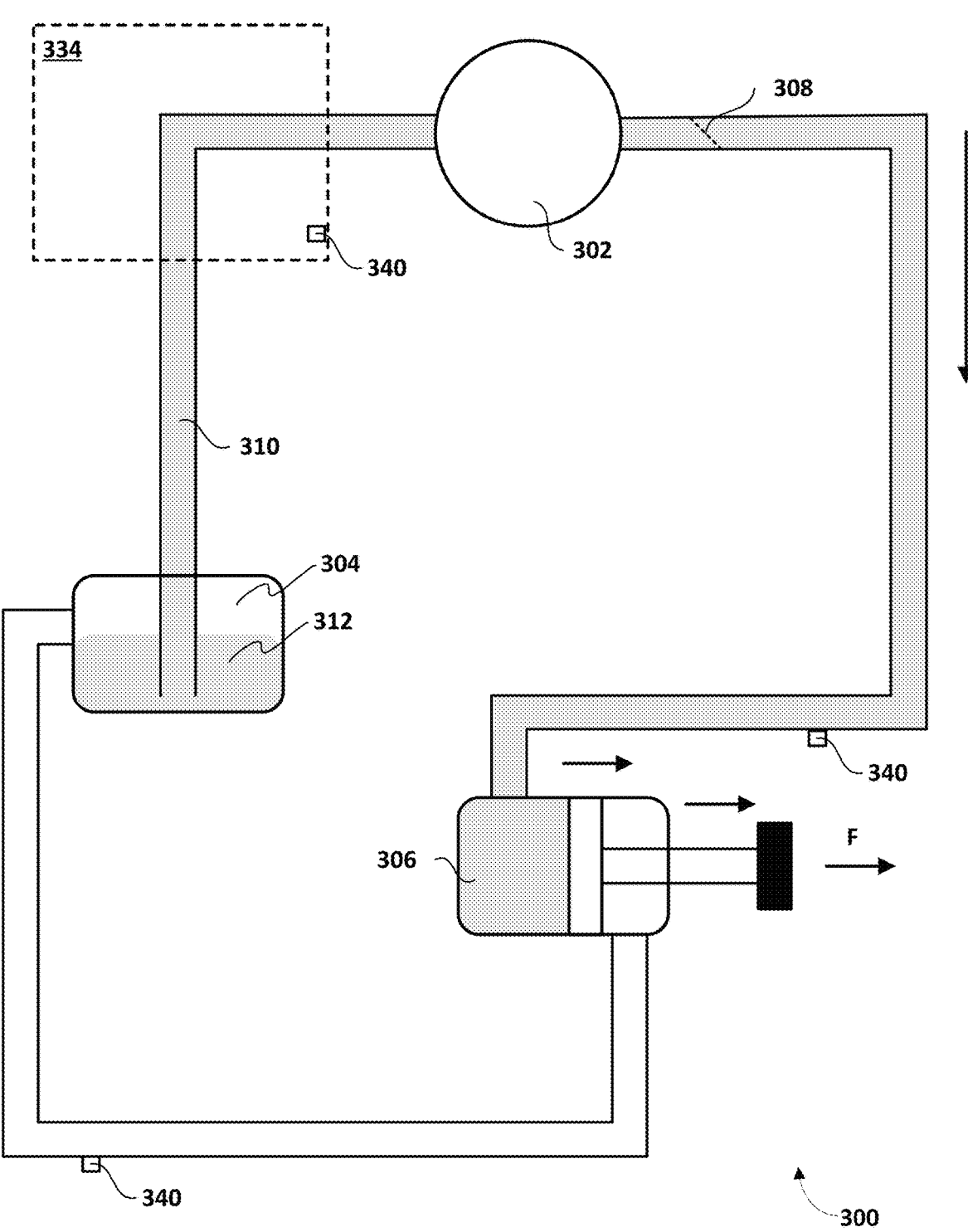
FIG. 3 depicts an example of how sensor packages may be deployed on a hydraulic system.

In some implementations the conduit may not be an irrigation boom, but rather a part of a hydraulic system 300 of a vehicle, robot, etc. An example of such a hydraulic system 300 is illustrated in FIG. 3, and may use liquid fluid power to perform work. The hydraulic fluid 312 may be pumped to various hydraulic motors and hydraulic cylinders throughout the vehicle, robot, etc. This fluid 312 may be controlled directly or automatically by control valves and distributed one or more conduits.

The exemplary hydraulic system 300 of FIG. 3 may include a hydraulic pump 302 used for raising, compressing, and/or transporting fluids 312 from one part of the hydraulic system 300 to another part of the system. This hydraulic fluid 312 is moved through the system by a conduit(s) 310 which connects the different components of the system and passes the hydraulic fluid 312 therethrough. These conduits 310 may be hoses, tubes, pipes, or the like. A reservoir 304 may also be included as a part of the system, the reservoir 304 being used for storing the fluid 312. One or more actuators 306 may also be a part of the system; the actuator(s) 306 converts hydraulic energy to mechanical energy (e.g. force F of FIG. 3). One or more valves 308 (illustrated in broken line) may be used to direct the flow of the fluid 312 contained within the system 300, as well as controlling the pressure and flow of the fluid 312. The hydraulic system 300 may cause the fluid to increase in temperature. These temperature changes may be detected by one or more temperature sensors 340 mounted on sensor package 334 (which may be similar to sensor packages 134, 234) and/or conduit 310. In some instances, changes in temperature that are detected by temperature sensor(s) 340, particularly increased heat, may be addressed by heat exchangers, cooling fluids, or the like.

In some implementations, like illustrated in FIG. 3, the system 300 may be an open system, where fresh fluid enters into the pump from the reservoir 304 and the fluid from the actuator 306 is passed into the reservoir. In other implementations, the system 300 may be a closed loop system, where the fluid may pass continuously between the pump and actuator without entering into the reservoir. The hydraulic system 300 of FIG. 3 is merely exemplary, and there may be various implementations of hydraulic systems.

In some implementations, for example where an agricultural vehicle or robot carries the sensor package(s) 334, the vehicle's hydraulic system (system 300 in FIG. 3) may be used to cool the sensor package(s) 334. Similar to the conduit described with reference to FIGS. 1 and 2, the hydraulic system 300 of the vehicle may also include a conduit 310 with a fluid 312 flowing therethrough, specifically for control of various hydraulic motors and/or machinery of the vehicle, as described herein. The conduit 310 of the hydraulic system 300 may also be used as a heat sink for sensor package(s) 334 by attaching the sensor package(s) 334 to the conduit 310 of the hydraulic system 300 (as schematically illustrated in FIG. 3). Additionally and/or alternatively, the route of the conduit 310 of the hydraulic system 300 may be altered (e.g. through one or more loops, diversions, etc.) so as to be disposed proximate the required location(s) of the sensor package(s) 334. Similar to previous implementations, at least a portion of the sensor package(s) 334 may be disposed in thermal contact with the conduit 310 of the hydraulic system 300, for example through the use of one or more TIMs described herein to facilitate heat dissipation between the heat-producing device (e.g., the sensor package 334) and a heat-dissipating device (e.g. the conduit 310).

As discussed with other implementations herein, the illustrated location and/or number of sensor packages 334 is not intended to be limiting. The location, spacing, and/or number of sensor packages 334 with respect to the conduit 310 may be determined by the particular sensors contained in the sensor packages 334 and/or the resulting use thereof.

Figure 5:
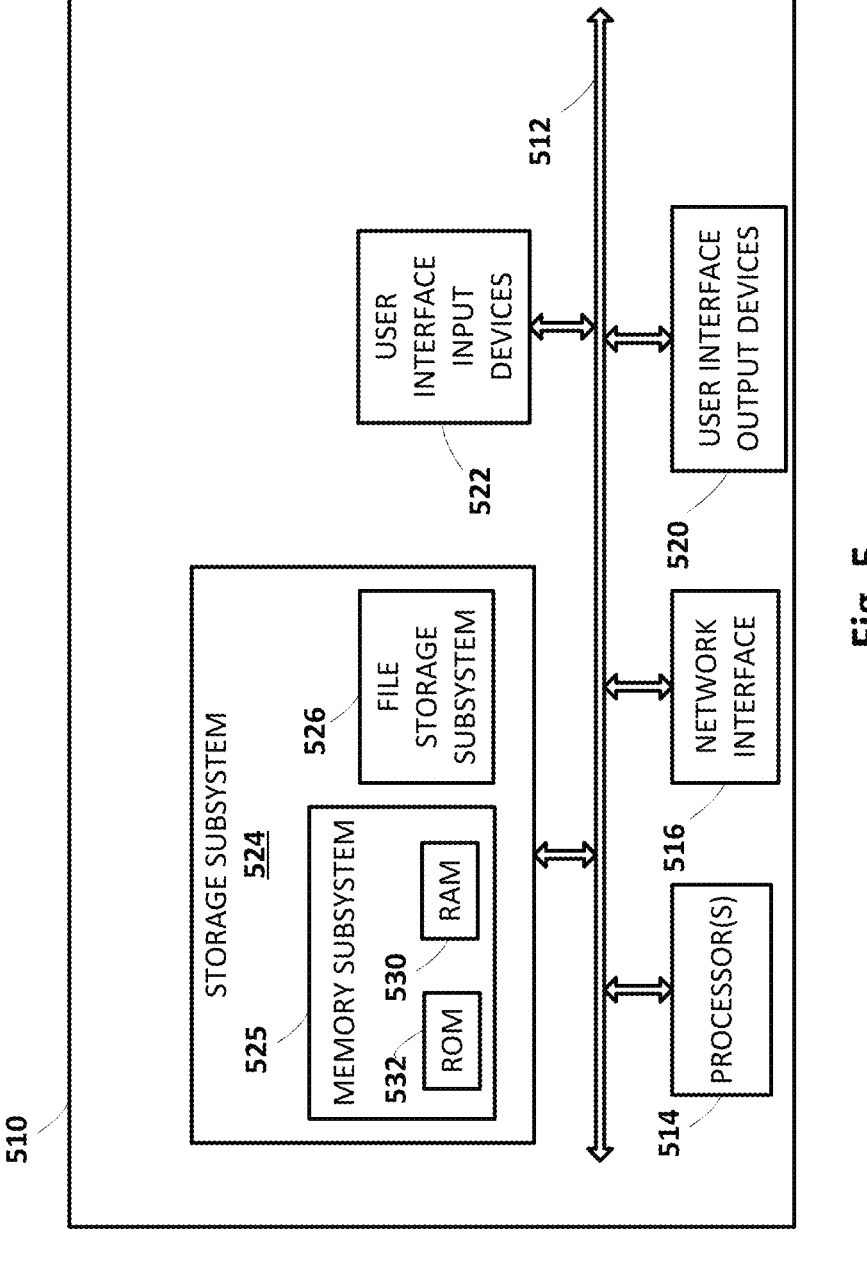
FIG. 5 schematically depicts an example architecture of a computer system.

FIG. 4 illustrates a flowchart of an example method 400 that may be implemented, for example by computing device 510 of FIG. 5, to facilitate the cooling of the sensor packages $234_{1-6}$. Other implementations may include additional operations than those illustrated in FIG. 4, may perform operation(s) of FIG. 4 in a different order and/or in parallel, and/or may omit one or more of the operations of FIG. 4.

At block 402, temperature data, including one or more temperatures and associated information, may be obtained by the one or more temperature sensors. As described herein, these temperature sensors may be disposed proximate one or more sensor packages and/or included within the sensor packages.

At block 404, the flow of the fluid (e.g. coolant) flowing through the conduit may be altered based on the obtained temperatures. In some implementations, altering the flow of the fluid may include processing the data collected by the temperature sensors through a machine learning model (block 406), determining if the sensor needs cooling (block 408) and/or determining how to reroute the fluid flowing through the conduit (block 410) to the locations/sensors targeted for cooling. In some implementations, the alteration of the flow of the fluid through conduit may include using one or more feedback loops (optional 412) to reroute or direct the flow of the fluid. In other implementations, altering the flow of the fluid may include opening and/or closing one or more valves (optional block 414) within conduit in order to route fluid to targeted locations of the conduit. Targeted locations may include, for example, locations where the temperature was detected as being higher than a predetermined or preset threshold and/or the warmest x-number of locations as determined by the temperature sensors. In further implementations, it may be desirable to utilize the data collected by the temperature sensors and the machine learning model to adjust additional components of the sensor package or agricultural vehicle (e.g. lights, engines, and/or other heat producing elements).

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 510 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 510 or onto a communication network.

User interface output devices 520 may include a display subsystem, a printer, a fax machine, or non-visual displays such as audio output devices or haptic feedback devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method 400 described herein, as well as to implement various components depicted in FIGS. 1-3.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A cooling system, the cooling system comprising:
a sensor package comprising one or more processors, the sensor package configured to measure a temperature of the one or more processors;
a reservoir containing an application fluid;
one or more sprayers to dispense the application fluid from the reservoir into a field at an application target or into the field absent the application target;
a conduit that fluidly couples the reservoir with the one or more sprayers, with a portion of the conduit thermally coupled to the sensor package, wherein:
the one or more sprayers are configured to spray the application fluid by flowing the application fluid from the reservoir through the conduit and out of the one or more sprayers; and
heat generated by the sensor package is dissipated into the application fluid as it flows through the conduit into the field;
a non-transitory computer-readable medium storing instructions that, when actuated by the one or more processors cause the system to:
responsive to identifying, using the sensor package, the measured temperature is below a threshold, spraying the application fluid at the application target in the field.

2. The cooling system of claim 1, wherein the sensor package is thermally coupled to the conduit through one or more thermal interface materials that conduct heat between the sensor package and the conduit.

3. The cooling system of claim 1, wherein the conduit is a fluid channel for a boom of a farming machine, and the application fluid is water, liquid fertilizer, liquid pesticide, or a combination thereof.

4. The cooling system of claim 1, wherein the conduit is constructed of a metal and the metal is a heat sink for heat dissipated by the sensor package.

5. The cooling system of claim 1, wherein the conduit is part of a hydraulic system.

6. The cooling system of claim 1 further comprising:
a temperature sensor disposed on a machine carrying the sensor package, the temperature sensor disposed in a position to sense temperature from the sensor package and coupled to one or more processors, wherein the one or more processors are configured to:
detect, by the temperature sensor, a temperature; and
based the detected temperature satisfying a threshold, alter a flow of the application fluid through the conduit.

7. The cooling system of claim 6, wherein the one or more processors include the at least one processor of the sensor package.

8. The cooling system of claim 6, wherein:
the sensor package is a first sensor package of a plurality of sensor packages,
the temperature sensor is a first temperature sensor of a plurality of temperature sensors, and
each sensor package of the plurality of sensor packages includes one temperature sensor of the plurality of temperature sensors; and
the one or more processors of cooling system are further configured to:
detect, for each of the plurality of temperature sensors, a temperature;
determine, for each of the plurality of temperature sensors, whether the detected temperature is above a predetermined threshold temperature; and
alter the flow of the application fluid based on the determination that the detected temperature is above the predetermined threshold temperature.

* * * * *